(12) United States Patent
Schoneck et al.

(10) Patent No.: US 12,051,870 B2
(45) Date of Patent: Jul. 30, 2024

(54) CRYOGENIC CHAMBER CONNECTOR

(71) Applicant: International Business Machines Corporation, Armonk, NY (US)

(72) Inventors: Kyle Schoneck, Rochester, MN (US); Layne A. Berge, Rochester, MN (US); Jason J. Bjorgaard, Rochester, MN (US); John R. Dangler, Rochester, MN (US); Matthew Doyle, Chatfield, MN (US); Thomas W. Liang, Rochester, MN (US); Matthew A. Walther, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 17/456,670

(22) Filed: Nov. 29, 2021

(65) Prior Publication Data

US 2023/0170641 A1 Jun. 1, 2023

(51) Int. Cl.
*H01R 13/207* (2006.01)
*G06N 10/40* (2022.01)
*H01R 24/28* (2011.01)

(52) U.S. Cl.
CPC .......... *H01R 13/207* (2013.01); *H01R 24/28* (2013.01); *G06N 10/40* (2022.01)

(58) Field of Classification Search
CPC .... H01R 2201/06; H01R 4/68; H01R 13/207; H01R 24/28; G06N 10/40
See application file for complete search history.

(56) References Cited

U.S. PATENT DOCUMENTS

| | | | | |
|---|---|---|---|---|
| 3,639,672 A | * | 2/1972 | Kafka | H10N 60/20 174/15.5 |
| 4,394,534 A | * | 7/1983 | Bahder | H01B 12/02 138/28 |
| 5,092,781 A | | 3/1992 | Casciotti | |
| 6,342,672 B1 | | 1/2002 | Kaneko | |
| 7,709,738 B2 | | 5/2010 | Mirebeau | |
| 2015/0300719 A1 | | 10/2015 | Strickland | |
| 2017/0038123 A1 | | 2/2017 | Strickland | |
| 2019/0042968 A1 | * | 2/2019 | Lampert | H10N 69/00 |

(Continued)

OTHER PUBLICATIONS

"IPC-TM-650 Test Methods Manual", The Institute for Interconnecting and Packaging Electronic Circuits, Mar. 1986, 3 pages.

(Continued)

*Primary Examiner* — Jean F Duverne
(74) *Attorney, Agent, or Firm* — Monchai Chuaychoo

(57) ABSTRACT

An approach for connecting electrical wiring between two chambers of varying temperatures is disclosed. One approach includes a first end of a wiring bundle comprising a first plurality of metal conductors; a second end of the wiring bundle comprising of equal number of metal conductors as the first end of the wiring bundle; the first end of the wiring bundle is separated by an air gap from the second end of the wiring bundle at a first temperature; and an insulator surrounding the wire bundle. Another approach includes the use of one or more SMA (shape-memory alloy) pins connecting the first end of the wiring bundle to the second end of the wiring bundle and that is separated by an air gap and a boundary plate.

20 Claims, 3 Drawing Sheets

(56) References Cited

U.S. PATENT DOCUMENTS

2020/0106149 A1* 4/2020 Gumann ............... H01P 11/001
2020/0403137 A1  12/2020 Lampert

OTHER PUBLICATIONS

Lemanski, Jennifer, "Cryogenic Shape Memory Alloy Actuators For Spaceport Technologies: Materials Characterization And Prototype Testing", Showcase of Text, Archives, Research & Scholarship (STARS), Electronic Theses and Dissertations, 2005, 107 pages.

* cited by examiner

CRYOGENIC CHAMBER CONNECTOR

BACKGROUND

The present invention relates generally to the field of quantum computing, and more particularly to electronic connectors between computing devices.

Quantum computers consist of a quantum processor (e.g., sets of quantum bits or qubits) that operates at various temperatures based on the makeup of materials used. For example, using heavy materials such as silicon or metals, the system needs to be cooled to extremely low temperature (close to absolute zero) and exists inside a sealed cryogenic chamber. There are difficulties associated with cooling electronics to low temperature requires a considerable cost, increased in size and complexities.

Another difficulty involves electronics within cryogenic chamber and room temperature electronics (RTE). Within a Cryogenic chamber, there are chambers of different temperatures (e.g., chambers closest to the Qubit is coldest, chambers closest to the RTE is warmer). Some quantum computer system may include electronics residing in both the cryogenic chambers and in room temperature chambers. The two chambers may be connected together by a boundary plate. There are boundary plates that are used to isolate the different chambers. However, the temperature differential are hard to control around the area of the boundary plate.

SUMMARY

Aspects of the present invention disclose one or more structures for connecting computer wiring between two chambers of varying temperatures associated with quantum computing. The first structure includes a first end of a wiring bundle comprising a first plurality of metal conductors; a second end of the wiring bundle comprising of equal number of metal conductors as the first end of the wiring bundle; the first end of the wiring bundle is separated by an air gap from the second end of the wiring bundle at a first temperature, wherein the first temperature is higher than 50 K (Kelvin); and an insulator surrounding the wire bundle.

The second structure includes a first end of a wiring bundle comprising a first plurality of metal conductors; a second end of the wiring bundle comprising of equal number of metal conductors as the first end of the wiring bundle; an insulator surrounding the wire bundle; one or more SMA (shape-memory alloy) pins connecting the first end of the wiring bundle to the second end of the wiring bundle; one or more pin brackets located at each opposite end of the one or more SMA pins; a male end connector located at the first end of the bundle of wiring and a female end connector located the second end of the bundle of wiring; and the male end connector is separated by an air gap and a boundary plate from the female end connector at a first temperature, wherein the first temperature is higher than 50 K (Kelvin).

BRIEF DESCRIPTION OF THE DRAWINGS

Preferred embodiments of the present invention will now be described, by way of example only, with reference to the following drawings, in which.

DETAILED DESCRIPTION

Figure 1:
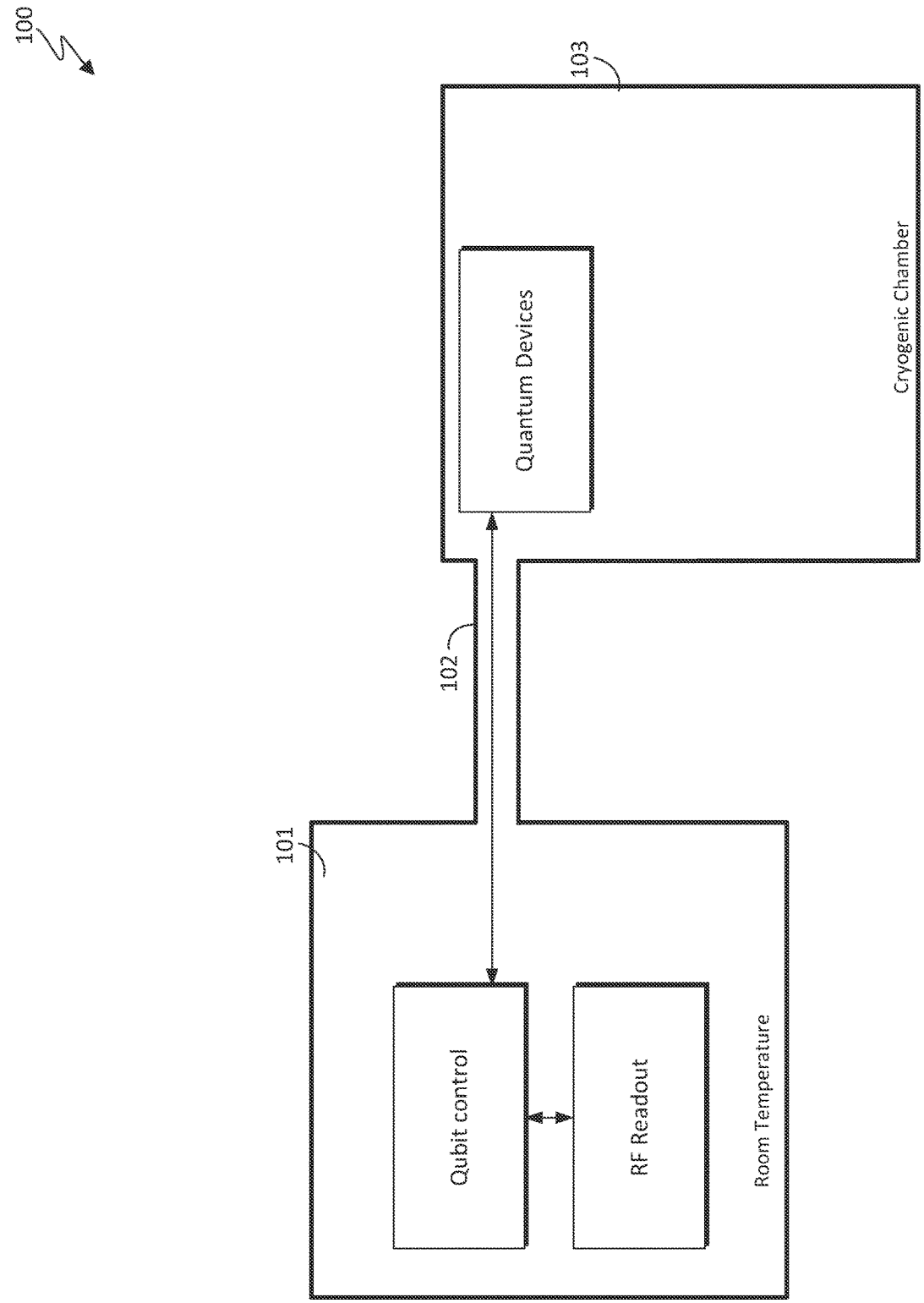
FIG. 1 is a functional block diagram illustrating a quantum computing system environment, designated as 100, in accordance with an embodiment of the present invention.

The current state of art as it pertains quantum computing, specifically with electronics residing in the cryogenic chamber and the room temperature chamber can present some challenges. The two chambers (e.g., cold and room temperature) are physically connected to each other in addition to the electronic computing devices. The electronic computing devices (in each chambers) are coupled with a mechanical and electrical connection. One challenge, for example, when the cryogenic chamber is not chilled, there are potential risks both electrically and thermally associated with the connection (i.e. connectors) while chilling. For example, the physical connection between chambers creates a thermal path that slows down, if not prevents, the cooling process.

Embodiments of the present invention recognizes the deficiencies in the current state of art as it relates to the connection between computing devices residing in a cryogenic chamber and in the room temperature chamber and provides an approach for isolating computing electronic devices in the cryogenic chamber from the room temperature electronics. The approach allows electrically disconnecting cables when the cryogenic is not below a set temperature, creating isolation between the cryogenic and RTE. Additionally, this "disconnection" also severs the thermal path. Thus, improving thermal isolation between chambers.

In other embodiment, another approach includes one or more cryogenic chamber connectors for a cryogenic chamber and room temperature chambers. Both chambers includes two or more unique areas of electronics, wherein qubit circuits are housed in one end of the chamber (the coolest sub-chamber), other cryogenic electronics are housed in the other sub-chambers and room-temperature electronics (RTE) enter at the end of the chamber (the warmest sub-chamber), opposite the sub-chamber housing the qubit electronics (the temperature gradient increasing from the Qubit end to the RTE end). The chambers also includes physical boundary plates that are used to isolate the different sub-chambers. The cryogenic chamber connectors has the following features: (i) means for the RTE and cryogenic electronics to be electrically disconnected between chambers until required temperatures are met (the opposite could also be disclosed, i.e. electrically connected until required temperatures are met); (ii) means for the sub-chambers to be thermally disconnected when the electrical disconnection occurs, thus, improving thermal isolation between chambers; (iii) disconnecting means may be a first inner conductor made of a first material within a second hollow outer conductor having a desired temperature expansion coefficient such that as the temperature cools the outer and inner conductors will be in electrical contact with one another providing electrical and thermal conductivity between chambers; and/or (iv) disconnecting means may be one or more s shape memory structure that pull the two sub-chambers together to make electrical and thermal contact at a given temperature.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a quantum computing system environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Quantum computing system environment 100 includes RTE (room temperature electronics) 101, RTE connectors 102 and cryogenic chamber 103.

RTE 101 are electronics that are typically used in room-temperature to operations associated with quantum computing such as, but not limited to, providing qubit control, providing voltage source, readout analyzer and readout generator. Cryogenic chamber 103 is the area where the quantum processor (e.g., CMOS chip, etc.) resides, which includes other accompany electronics (read out) associated with analyzing qubit computation.

Figure 2A:
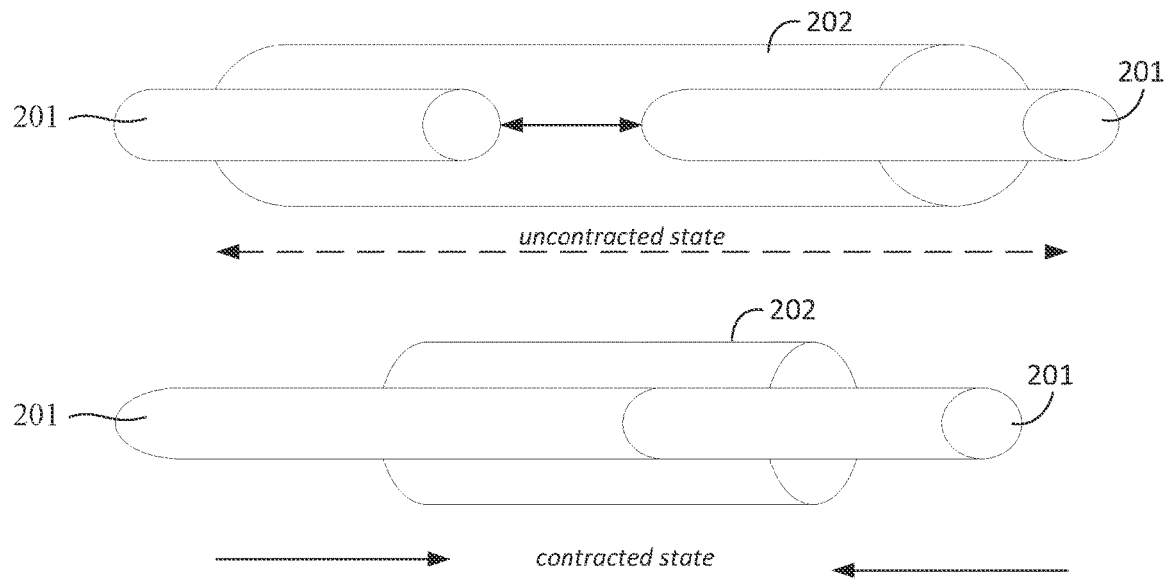
FIG. 2A is a diagram illustrating cryogenic connector, in accordance with one embodiment of the present invention.

FIG. 2A is a diagram illustrating RTE connector 102, in accordance with one embodiment of the present invention. FIG. 2A includes wire insulator 202 and wire conductor 201. Wire insulator 202 is made from temperature dependent dielectric materials, wherein under extreme cold temperatures, the insulator/outer covering would contract (i.e., contracted state of FIG. 2A), creating electrical connection for wire conductor 201. Conversely, under normal (room temperature), wire insulator would be in a relaxed (i.e., uncontracted state of FIG. 2A). Wire insulator 202 can be made from materials varying CTE (coefficient of linear thermal expansion), such as, silicon, copper and plexiglass (see Table 1). For example, wire insulator 202 is made from plexiglass (see Table 1 for linear expansion property of plexiglass in varying temperatures). The selection of materials for wire insulator 202 is dependent on the application. For example, user can select a material that that can expand and/or contracts (while under a temperature at 5 K—Kelvin) within 80% of the original length under 100 K. In another example, user can select a material that that can expand and/or contracts (while under a temperature at 5 K—Kelvin) within 50% of the original length under 100K.

TABLE 1

Linear Thermal expansivities, α, for several typical solids for 300, 10 and 5K (Kelvin). Units are $10^{-8}$/K or 1 Angstrom/cm-K.

| | Temperature | | |
|---|---|---|---|
| | 300K | 10K | 5K |
| Silicon | 262 | (0.05) | (0.006) |
| Copper | 1671 | 3.00 | 0.45 |
| 304 Stainless Steel | 1590 | −44 | −27 |
| Plexiglass (PMMA) | 8000 | 279 | 53 |

Figure 2B:
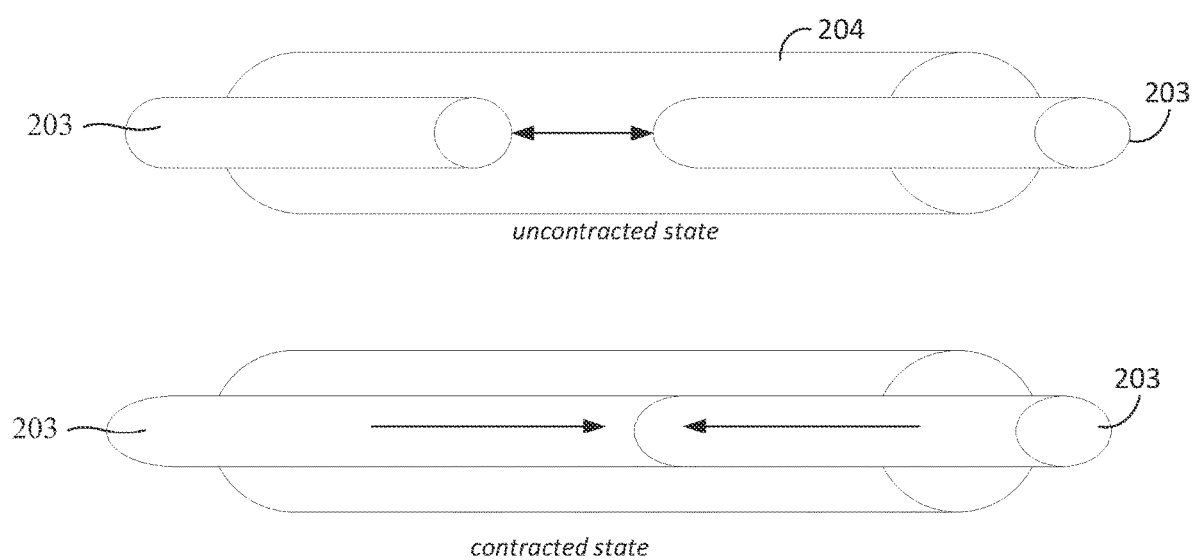
FIG. 2B is a diagram illustrating cryogenic connector, in accordance with another embodiment of the present invention.

FIG. 2B is a diagram illustrating RTE connector 102, in accordance with one embodiment of the present invention. FIG. 2B includes wire insulator 204 and wire conductor 203. Wire conductor 203 is made from temperature dependent materials, wherein under extreme cold temperatures, the core wire conductor would contract (i.e., contracted state of FIG. 2B), creating electrical connection for wire conductor 203. Conversely, under normal (room temperature), wire conductor 203 would be in a relaxed (i.e., uncontracted state of FIG. 2B). For example, wire conductor 203 is made from copper (see Table 1 for linear expansion property of copper in varying temperatures). The selection of materials for wire conductor 203 is dependent on the application. For example, user can select a material that that can expand and/or contracts (while under a temperature at 5 K—Kelvin) within 80% of the original length under 100K. In another example, user can select a material that that can expand and/or contracts (while under a temperature at 5 K—Kelvin) within 50% of the original length under 100K.

Figure 3:
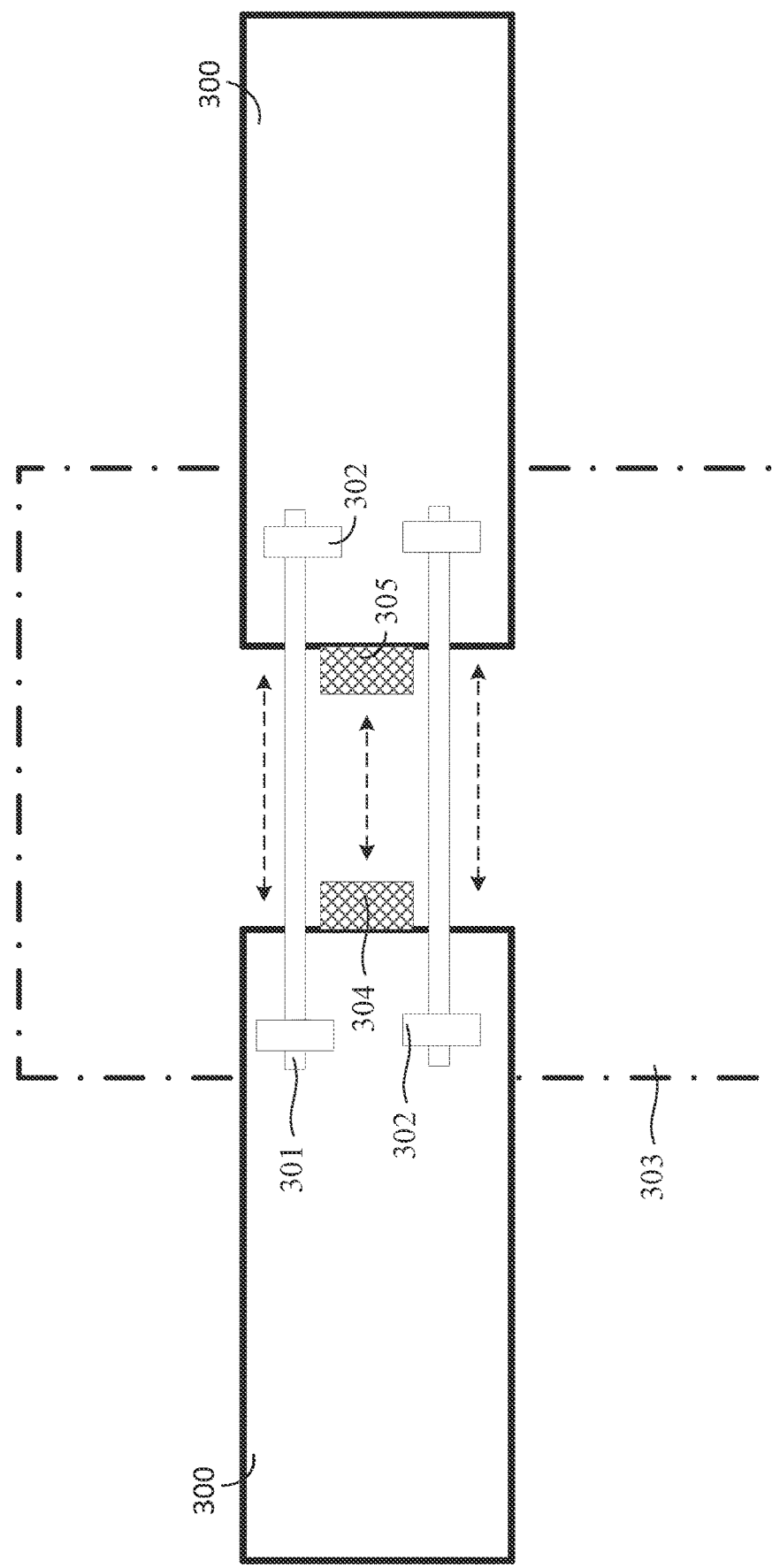
FIG. 3 is a diagram illustrating cryogenic connector, in accordance with another embodiment of the present invention.

FIG. 3 is a diagram illustrating RTE connector 102, in accordance with another embodiment of the present invention. FIG. 3 includes cable 300, SMA (shape memory alloy) pin 301, SMA bracket 302, boundary plate 303, electric wire connector female 304 and electric wire connector male 305.

Cable 300 is cable that connects electronic communication between RTE and electronics in cryogenic chamber 103. Cable 300 is bisected by boundary plate 303. Boundary plate 303 is a thermal isolation plate that separates the two chambers (cryogenic and room temperature). The thickness of boundary plate 303 can vary between 10 to 100 mm. Cable 300 contains electrical connection as electric wire connector female 304 and electric wire connector male 305. Wire connector female 304 and electric wire connector male 305 can contain multiple pins to carry multiple wire signals and the physical connectors (e.g., male and female ends) can be made into various shapes as long as both ends can be physically coupled together to form an electrical connection for cable 300. For example, a screw-in micro connector assembly or any existing wire connection in the known art can be used as wire connector female 304 and electric wire connector male 305.

SMA (shape memory alloy) pin 301 can be rod shape structure that physically connects the two opposing side of cable 300. SMA bracket 302 is located at each end of the SMA pin 301 as guide for the pin during contraction and expansion phase. SMA pin 301 is a temperature dependent connector using shape-memory alloy. Recall that SMA is an alloy that deformed when it is cold but return to its original ("remembered") shape when heated. Alloys that falls in the SMA category includes, but it is not limited to, copper-aluminum-nickel, nickel-titanium or varying mixture of zinc, copper, gold and iron. For example, SMA pin 301 is made from nitinol (alloy of nickel and titanium) since it's the most widely used SMA.

FIG. 3 illustrates the use of SMA connection between two chambers of different temperature. For example, at cryogenic temperatures, SMA pin 301 shrinks enough to make electrical/thermal connection (i.e., between 304 and 305). However, before this occurs, there is a true electrical/thermal isolation between the two temperature chambers.

Finally, the proposed concept may be summarized in a nutshell in the following clauses:

1. RTE and Cyrogenic electronics will be electrically disconnected until required temperatures are met.
2. The opposite could also be disclosed, i.e., electrically connected until required temperatures are met. This would effectively reduce the need for the heat switches.
3. The chilling process will take less time and be easier to get to temperature with this connector.
4. Allow for greater bandwidth. Connector could allow more electrical connections than a typical design.
5. The system would be prohibited from sending electrical data outside of the temperature range within which calibration had occurred, "aka temperature-dependent dielectric and/or systems."

What is claimed is:

1. A structure for connecting computer wiring between two chambers of varying temperatures associated with quantum computing, the structure comprising:
   a first end of a first wiring bundle comprising a first plurality of metal conductors;
   a second end of second wiring bundle comprising of equal number of metal conductors as the first end of the first wiring bundle;
   the first end of the wiring bundle is separated by an air gap from the second end of the wiring bundle at a first temperature, wherein the first temperature is higher than 50 K (Kelvin); and
   an insulator surrounding the wire bundle, wherein the insulator is made from a material that has a varying CTE (coefficient of linear thermal expansion) and the insulator contracts based on a second temperature, wherein the second temperature is lower than 1 K (Kelvin) and the contraction of the insulator brings the first end of the wiring bundle together with the second end of the wiring bundle to form an electrical connection.

2. The structure of claim 1, wherein the insulator contracts based on a second temperature, wherein the second temperature is lower than 1 K (Kelvin) and the contraction of the insulator brings the first end of together with the second end of the wiring bundle to form an electrical connection.

3. The structure of claim 1, wherein the insulator expands based on the first temperature and the expansion of the insulator separates the first end from the second end of the wiring bundle.

4. The structure of claim 1, wherein the insulator is made from plexiglass.

5. The structure of claim 1, wherein the air gap separates the two chambers.

6. The structure of claim 1, wherein a first chamber of the two chambers is at room temperature.

7. The structure of claim 1, wherein a second chamber of the two chambers is at cryogenic temperature, such as below 5 K (Kelvin).

8. A structure for connecting computer wiring between two chambers of varying temperatures associated with quantum computing, the device comprising:
   a first end of a first wiring bundle comprising a first plurality of metal conductors;
   a second end of second wiring bundle comprising of equal number of metal conductors as the first end of the first wiring bundle;
   the first end of the wiring bundle is separated by an air gap from the second end of the wiring bundle at a first temperature, wherein the first temperature is higher than 50 K (Kelvin); and
   an insulator surrounding the wire bundle, wherein the plurality of metal conductors are made from materials with varying CTE (coefficient of linear thermal expansion) and the plurality of metal conductors contracts based on a second temperature wherein the second temperature is lower than 1 K (Kelvin) and the contraction of the plurality of metal conductors brings the first end of the first wiring bundle together with the second end of the second wiring bundle to form an electrical connection.

9. The structure of claim 8, wherein the plurality of metal conductors contracts based on a second temperature wherein the second temperature is lower than 1 K (Kelvin) and the contraction of the plurality of metal conductors brings the first end of together with the second end of the wiring bundle to form an electrical connection.

10. The structure of claim 8, wherein the plurality of metal conductors expands based on the first temperature and the expansion of the plurality of metal conductors separates the first end from the second end of the wiring bundle.

11. The structure of claim 8, wherein the plurality of metal conductors is made from copper.

12. The structure of claim 8, wherein the air gap separates the two chambers.

13. The structure of claim 8, wherein a first chamber of the two chambers is at room temperature.

14. The structure of claim 8, wherein a second chamber of the two chambers is at cryogenic temperature, such as 5 K (Kelvin).

15. A structure for connecting computer wiring between two chambers of varying temperatures associated with quantum computing, the structure comprising:
   a first end of a wiring bundle comprising a first plurality of metal conductors;
   a second end of the wiring bundle comprising of equal number of metal conductors as the first end of the wiring bundle;
   an insulator surrounding the wire bundle;
   one or more SMA (shape-memory alloy) pins connecting the first end of the wiring bundle to the second end of the wiring bundle;
   one or more pin brackets located at each opposite end of the one or more SMA pins;
   a male end connector located at the first end of the bundle of wiring and a female end connector located the second end of the bundle of wiring; and
   the male end connector is separated by an air gap and a boundary plate from the female end connector at a first temperature, wherein the first temperature is higher than 50 K (Kelvin).

16. The structure of claim 15, wherein the one or more SMA pins contracts based on a second temperature wherein the second temperature is lower than 1 K (Kelvin) and the contraction of the one or more SMA pins brings the first end of together with the second end of the wiring bundle to form an electrical connection.

17. The structure of claim 15, wherein the one or more SMA pins expands based on the first temperature and the expansion of the one or more SMA pins separates the first end from the second end of the wiring bundle.

18. The structure of claim 15, wherein the one or more SMA pins is made from alloy comprising of nickel and titanium.

19. The structure of claim 15, wherein the boundary plate has a thickness ranging from 10 to 100 mm.

20. The structure of claim 15, wherein a second chamber of the two chambers is at cryogenic temperature, such as 5 K (Kelvin).

* * * * *